United States Patent
Thierry (10) Patent No.: US 11,753,259 B2
(45) Date of Patent: Sep. 12, 2023

(54) PROCESS AND SYSTEM FOR MANUAL MULTI-LAYER STACKING OF ARTICLES ON A LOAD CARRIER

(71) Applicant: Dematic SAS, Bussy Saint Georges (FR)

(72) Inventor: Audrey Thierry, Douai (FR)

(73) Assignee: Dematic SAS, Bussy Saint Georges (FR)

( * ) Notice: Subject to any disclaimer, the term of this patent is extended or adjusted under 35 U.S.C. 154(b) by 106 days.

(21) Appl. No.: 17/324,400

(22) Filed: May 19, 2021

(65) Prior Publication Data
US 2021/0362965 A1  Nov. 25, 2021

(51) Int. Cl.
*B65G 57/03* (2006.01)
*B65B 11/58* (2006.01)
*B65G 1/137* (2006.01)

(52) U.S. Cl.
CPC .......... *B65G 57/035* (2013.01); *B65B 11/585* (2013.01); *B65G 1/1376* (2013.01); *B65G 1/1378* (2013.01); *Y10S 414/109* (2013.01)

(58) Field of Classification Search
CPC .... B65G 57/00; B65G 57/035; B65G 1/1376; B65G 57/22; Y10S 414/109;
(Continued)

(56) References Cited

U.S. PATENT DOCUMENTS

| 7,033,130 B2 * | 4/2006 | Watson | B65G 59/00 414/796.2 |
| 9,315,337 B2 | 4/2016 | Cavelius | |

(Continued)

FOREIGN PATENT DOCUMENTS

| EP | 2358617 A1 | 8/2011 | |
| EP | 2918524 A1 * | 9/2015 | ........... B65G 57/035 |

(Continued)

OTHER PUBLICATIONS

Palamatic brochure entitled, "Expert Solutions in Lifting & Handling", published Feb. 18, 2016, retrieved from https://www.agema.be/files/folder_palamatic.pdf.

(Continued)

*Primary Examiner* — Gregory W Adams
(74) *Attorney, Agent, or Firm* — Gardner, Linn, Burkhart & Ondersma (57) ABSTRACT

A process and system for manual multi-layer stacking of objects having different dimensions on a load carrier in a predetermined spatial arrangement including determining the spatial arrangement of the objects to be packed according to an order listing, delivering the objects to a supply level of a workstation in a sequence based on the spatial arrangement automatically by an autonomous mobile robot and/or an automated guided vehicle, supplying objects to a working level of the workstation and there presenting the objects to the operator, manually moving the objects onto a support connected to a manual stacking station in the working level and presenting the load carrier in the manual stacking station, where the load carrier defines a work surface for the stack being formed on four sides as it is packed with objects, and manually placing each object at a position in the stack according to the predetermined spatial arrangement.

19 Claims, 6 Drawing Sheets

(58) Field of Classification Search
CPC .............. Y10S 414/106; Y10S 414/108; Y10S 414/107; B65B 11/585
See application file for complete search history.

(56) References Cited

U.S. PATENT DOCUMENTS

| | | | |
|---|---|---|---|
| 9,315,344 B1 | 4/2016 | Lehmann | |
| 2009/0074545 A1* | 3/2009 | Lert, Jr. | B65G 1/1378 414/267 |
| 2009/0136328 A1* | 5/2009 | Schafer | B65G 1/026 414/807 |
| 2014/0178161 A1 | 6/2014 | Moosburger | |
| 2017/0039304 A1 | 2/2017 | Kim et al. | |

FOREIGN PATENT DOCUMENTS

| | | | |
|---|---|---|---|
| EP | 2918524 A1 | 9/2015 | |
| EP | 2995579 A1 * | 3/2016 | ........... B65G 1/0471 |
| EP | 2769341 B1 | 6/2016 | |
| WO | 2008067516 A2 | 6/2008 | |
| WO | 2009109218 A1 | 9/2009 | |
| WO | WO-2009109218 A1 * | 9/2009 | ........... B65G 57/035 |
| WO | 2018148536 A1 | 8/2018 | |

OTHER PUBLICATIONS

Dematic brochure entitled, "Dematic Automated Guided Vehicles", published Feb. 28, 2018, retrieved from https://retail-chain.fr/media/Presentation/eu_br_019_en_agv_screen_855796.pdf.
European Search Report from the corresponding European Patent Application No. EP2015619.4, dated Oct. 30, 2020.
G. Abdou & M. Yang: "A systematic approach for the three-dimensional palletization problem", International Journal of Production Research, May 7, 2007, p. 1, (Retrieved from the Internet: URL:http://dx.doi.org/10.1080/00207549408957074).

* cited by examiner

PROCESS AND SYSTEM FOR MANUAL MULTI-LAYER STACKING OF ARTICLES ON A LOAD CARRIER

CROSS REFERENCE TO RELATED APPLICATION

The present application claims the priority benefits of European patent application no. EP20175619.4, filed on May 20, 2020.

BACKGROUND AND FIELD OF THE INVENTION

The invention relates to a process for manual multi-layer stacking of articles on a load carrier, in particular a pallet, with articles to be stacked having different dimensions, in a predetermined spatial arrangement and a corresponding system.

The automatic stacking of a support or load carrier without supporting sides, in particular a pallet or a rolling truck, with objects to be packed in order to form a stack, i.e. palletization, is known per se. However, in this case objects to be packed which have uniform size or dimensions are laid down by robots, gripping devices etc. at computationally determined locations.

In contrast, the process of fully automatically loading a load carrier with objects to be packed which have different dimensions in order to form a stack is a matter of so-called automatic "mixed-case" palletizing.

In which case, different aspects must be taken into account and these enormously increase the complexity compared with "simple" stacking. A subsequent object to be packed can therefore only be stacked or placed on a previous object in a satisfactory manner if this previous object has a flat or even surface which should also be oriented approximately horizontally, and if the object can bear the weight of the further objects placed on it without being damaged.

U.S. Pat. No. 9,315,337 B1 describes a device for automatic stacking of packages on a support in a predetermined spatial arrangement for formation of a stack, having at least one supply conveyor which provides the separated packages in a predetermined order. A lifting and lowering unit is included for lifting and lowering said support disposed in a stacking site in the Y direction and a displacement device which adjoins an output end of the supply conveyor and which receives packages from the supply conveyor and transports them to the predetermined position in the stack. The displacement device includes a positioning conveyor adjoining the output end of the supply conveyor and being disposed horizontally and longitudinally with respect to one side of the stacking site in order to position the packages in the X direction, and at least one pushing plate and a pusher in order to transport the packages from the positioning conveyor in the Z direction to the predetermined position in the stack. The at least one pushing plate is formed as a flat strip-like plate, formed to be able to move horizontally and along the side of the stacking site and transverse thereto, in order to receive the packages as the packages are being pushed by the pusher off the positioning conveyor at the X direction position and to lay them in the Z direction on the support or in the stack. The pusher is formed as an arrangement of a plurality of individual pushers disposed horizontally and along the side of the stacking site, which push the packages off the positioning conveyor in the direction of the stack, wherein the individual pushers can each move independently of the at least one pushing plate in the Z direction in order to retain the package when the pushing plate is being withdrawn.

WO 2009/109218 A1 describes a semi-automatic multi-layer stacking of a pallet, with objects to be packed having different dimensions, in a spatial arrangement, comprising the following steps: computer-aided determination of the order of the objects to be packed on the support; delivering the separate objects to be packed in an order required for this purpose by means of a conveying system; taking the objects to be loaded from the conveying system by at least one operator who lays the respective object down at a desired spatial position on the stack being formed on the load carrier and presenting the load carrier in a hopper like device which defines a work surface and forms a support for the stack being formed on the load carrier on four sides as it is packed. The movable load carrier is oriented at a height of approximately one stacking layer below the work surface within the hopper like device.

SUMMARY OF THE INVENTION

The present invention provides a manual and manual assisted process and a workstation for manual multi-layer stacking of a load carrier with objects having different dimensions in a predetermined spatial arrangement, which process and workstation permit manual mixed-case stacking in a highly flexible manner and with a high throughput, while also maintaining accuracy and efficiency and with consideration for the operators' well-being, without the need for structured interfaces and implementations.

According to an aspect of the invention, an ergonomic high performance picking station can be provided without the need for structured interfaces and implementations, i. e. supply and discharge conveying system throughout the warehouse, if the process for manual multi-layer stacking of objects on a load carrier in a predetermined spatial arrangement, in particular on a pallet or roller cart, with the objects having different dimensions, comprises the following steps: computer-aided determination of the spatial arrangement of the objects to be packed on the load carrier according to an order listing said objects; delivering the objects to a workstation according to a sequence based on the spatial arrangement in a supply level; supplying objects to a working level in said workstation; presenting objects to the operator at the working level; manually moving the objects onto a support which is in the working level and is connected to a manual stacking station in the working level and presenting the load carrier in the manual stacking station which defines a work surface and forms a support for the stack being formed on the load carrier on four sides as it is packed with the objects; manually placing each object at a position according to the predetermined spatial arrangement in the stack being formed on the load carrier in the manual packing station; and the objects are automatically delivered by means of an autonomous mobile robot (AMR) and/or an automated guided vehicle (AGV).

The use of an autonomous mobile robot (AMR) and/or an automated guided vehicle (AGV) allows for flexible use of available space and change of routing when needed in contrast to structured technology (fixed infrastructure).

Automated guided vehicles (AGV) comprise mobile self-driving transportation platforms that usually follow given routes e.g. along marked long lines or wires on the floor, or uses radio waves, vision cameras, magnets, or lasers for navigation and transport objects, usually—but not limited to—in the form of pallet loads. They have the ability to automatically move and pick objects in manufacturing facilities and distribution centers, warehouses based on predefined routes etc. An autonomous mobile robot (AMR) is similar to an AGV. An AMR is usually more sophisticated than an AGV and is able to navigate dynamically as well as plan its own path. It is usually equipped with on board devices, such as controls and/or sensors, to understand and react to the operating environment. This gives it a high flexibility in multiple order fulfillment use applications.

Both AGVs and AMRs transport items to and from a location. In particular embodiments finished load carriers are automatically discharged by the AMR and/or AGV from manual packing station in the supply level. In other words, the AMR and/or AGV are used not only for supply of objects to the station but also for discharge of finished load carriers and then possibly the transportation to a shipping area. It is also possible to use the AMR and/or AGV for supply of empty load carriers too.

In one preferred embodiment objects according to the spatial arrangement are supplied in a supply level from a pre-picking facility such as a pallet warehouse in a grouped manner, especially on pallets, by means of AMR and/or AGV. This allows for simplifying and optimizing the picking process at the workstation. This also allows (together with the computer aided spatial arrangement) for strict sequencing of objects (donors). Such a computer aided determination of a spatial arrangement can be performed as disclosed in EP 2 769 341 B1 or G. Abdou & M. Yang: "A systematic approach for the three-dimensional palletization problem", International Journal of Production Research, 7 May 2007, page 1, (Retrieved from the Internet: URL:http://dx.doi.org/10.1080/00207549408957074) To improve performance, the workstation may have two object supplies and one manual packing station, preferably in a linear arrangement with the object supplies on opposite sides of the manual packing station (2-1 or 1-1-1 arrangement). It is to be understood, that the workstation may also have more than two object supplies and then also more than one manual packing station. It is also possible to have more than one operator to increase efficiency, heavy load handling etc. The operator(s) may then switch from first object supply to second object supply during exchange of a used object supply carrier in the first object supply.

A combination or collaboration of manual—human-worker and put robot is also possible. When handling large and/or heavy objects/loads the operator may be assisted by a material handling arm, manipulators or hand guided collaboration for manually moving the objects from the supply to the support and/or from the support to the load carrier, which assist by countering/supporting the weight of the objects. Main purposes of such assisting systems are improvement of ergonomics, increase load handling range or workstation performance. In the work area it is preferred that the reduction of friction is made by a conveying system which in turn is preferably a ball conveyor or roller conveyor.

In a preferred embodiment the supply level is arranged below the working level. This e. g. allows to have the AGV/AMR supply and discharge on a normal ground floor above a workstation on a raised mezzanine. In other words, an exchange of used object supply carriers takes place on the supply level, in particular AGV or AMR pick the object supply carriers and return them to storage and/or pre-picking facility for reuse.

The workstation may have many different features and embodiments. A particular version is configured such that supplying and presenting objects to the working level in the workstation takes place by a hopper like supply device. In other words, objects are supplied from below and raised to the working level in a kind of depalletization device.

To facilitate the stack building according to the predetermined spatial arrangement and the order, the operator is informed how many objects to pick from the object supply and/or where to place the objects on the load carrier according to the predetermined spatial arrangement in the stack (S). This is preferably done by a corresponding display. The display can be present at both the stating station and the object supply.

Manual is to be understood as the manual stack building (stacking) with or without automated support/assistance for the operator or controlled collaboration with pick/put robot in terms of object pick supply and/or object handling, especially when objects are heaving and/or bulky.

The invention also pertains to a corresponding system. Such a system may be a warehouse or distribution center or the like. In such a system for multi-layer stacking of objects on a load carrier in a spatial arrangement, in particular a pallet or roller cart, with objects having different dimensions, a workstation is used for manual placement of each object at a position according to said predetermined spatial arrangement in the stack being formed on a load carrier. The objects are automatically delivered to the workstation in sequence based on the spatial arrangement by an autonomous mobile robot and/or an automated guided vehicle and with the system having a computer system, which is implemented to predetermine the spatial arrangement according to an order listing the objects.

In one preferred embodiment, the workstation comprises a supply level and a working level, the supply level preferably being arranged below the working level, which allows to have the AGV/AMR supply and discharge on a normal ground floor above a workstation on a raised mezzanine. The system further includes a supply level having a receiving interface for receiving supplied objects and a discharge interface for discharge of finished load carriers, which allows for easy docking of the AMR/AGV and exchange of loads between them. Also included is a hopper like supply device supplying and presenting objects to the working level including an elevator for lowering and/or raising the supplied objects between the supply level and the working level, which allows for easy presentation and supply of objects to the operator at an ergonomic level and style. A hopper like stacking device is provided for presenting the load carrier in the manual stacking station which defines a work surface and forms a support for the stack being formed on the load carrier on four sides as it is packed with the objects and including an elevator for lowering and/or raising the load carrier between the supply level and the working level, which allows for easy manual stack building and placement of objects at a desired location by the operator at an ergonomic level and style. Also provided is a support with reduced friction on the working level and connected between the hopper like supply device and the hopper like stacking device, which allows for easy transfer of heavy and bulky loads from the supply to the stacking station.

A workstation according to the invention may have two hopper like supply devices and one hopper like stacking device, preferably in a linear arrangement with the two hopper like supply devices on opposite side of the one hopper like stacking device. As set forth above, this is only one preferred embodiment and several other implementations are possible.

The operator's working space, i. e. the workstation may be augmented by a material handling arm or manipulator at the hopper like supply device and/or hopper like stacking device, to ease handling of heavy and bulky loads.

When the support with reduced friction is a conveyor, in particular a ball conveyor or a roller conveyor, the transfer from the supply to the stacking is also easier. Such conveyors may be actively driven or without a drive.

The workstation may incorporate a display for informing the operator how many objects to pick from the object supply and/or where to place the objects on the load carrier according to the predetermined spatial arrangement in the stack. Such a display may be present at the supply hopper and also stacking hopper to ensure conformity with the predetermined spatial arrangement of the stack. The workstation operator can also be supported for picking and putting by visual pick/put aids e. g. a headset with an integrated camera and augmented reality technology or pick and/or put by light via beamer pointer what to pick and where to put or gesture controls to control material flow or other devices in the workstation area.

To stabilize the stack, a wrapping unit arranged below the hopper like stacking device for layer wise stabilizing of the stack being formed upon the load carrier may be used. It may wrap the stack being formed or alternatively the complete whole stack after finishing the stacking process. Further the load carrier is alternatively supported by either a load carrier support or a load carrier feed device. This allows for minimizing down times due to change of the load carriers and allows for a constant work flow. In one preferred arrangement the load carrier is initially supported by the load carrier feed device within the hopper and after leaving the hopper like device by the load carrier support.

The operator may indicate when a load carrier is finished stacking and an empty load carrier may be inserted into the hopper like device by means of the load carrier feed device. For this the workstation, especially the manual stacking station, may include a pushbutton, foot pedal or touch screen to confirm the finished stacking etc. This allows for automatic removal when the stack building is finished the load carrier, i. e. the operator does not have to worry about the changing of the load carriers.

An empty load carrier may be inserted into the hopper like device as soon as the prior stacked load carrier has been lowered sufficiently. A sliding plate could be positioned at the time of changeover of the load carrier. Stacking is possible to start on this plate and the partial stack would then be transferred to the load carrier later. Additionally, the stacked load carrier may be stabilized during stacking after leaving the hopper like device and the stacking takes place directly on a final or temporary load carrier. The stacked load carrier is preferably stabilized during stacking after leaving the hopper like device and the stabilization takes place underneath the hopper like device. This allows for finishing the stabilization while a new empty load carrier is inserted by the load carrier feed device, as the stacked load carrier is supported and moved by the load carrier support. Therefore, the stack is stabilized at all times, even after leaving the relatively short chute of the hopper like device. The stacked load carrier may be stabilized by wrapping with sheeting, netting or the like.

If the stacking takes place directly on the final load carrier, i. e. without a temporary or intermediate support, the finished stack on the load carrier needs not be shifted, which saves time and increases throughput as well as simplifies the process and related workstation. If the stacking takes place on a temporary load carrier, the finished stack may be transferred to a final carrier before strapping for example.

In order to achieve a constant working height, the load carrier can be lowered incrementally by approximately one packing level height once each level is complete. The objects or cases can be fed via a conveying system and delivered at the same height as the work surface in order to eliminate any further need for the operator to reach or bend unnecessarily. The objects can be of varying sizes, weights and shapes.

Load carrier stability is also an issue, and some means of ensuring this during packing and during transport is important. Therefore, the hopper like device may support the stack with its four sides. To increase the packing rate and also load stability, the system also provides objects in an appropriate order to aid the process. This helps to increase the operator efficiency and throughput rates.

In order to reduce the manual handling required and increase the throughput rate, the load carrier is automatically injected into its starting position and also transported away after finishing packing. Likewise, an empty load carrier is inserted into the hopper like device as soon as the prior stacked load carrier has been lowered sufficiently. To reduce downtime during exchange, a sliding plate or temporary support as described in EP 2 358 617 A1 may be used. The conveying system is connected to the hopper like stacking device level with its work surface, so that the operator only has to slide the objects over the work surface without lifting.

The load carrier feed device may also act as a load carrier destacker for load carriers presented or supplied in a stacked configuration. The feed device will therefore take the lowest load carrier from a stack of load carriers from the load carrier delivery conveyor. This allows to maximize the capacity of the delivery and also save space.

The supply level may have a receiving interface for receiving supplied objects, preferably in the form of pallets, and a discharge interface for discharge of finished load carriers, also preferably in the form of pallets. The interfaces may be provided as short (stub) conveyors, especially short roller conveyors, allows drop off or pick of and decoupling of the hopper like devices with the elevators from the supply and/or discharge.

It is envisaged that the complete process in a preferred embodiment may be undertaken as follows:

The operator workstation will include two object supplies a manual stacking station in between in a linear arrangement, connected to each other by a ball conveyor. Both the object supplies and the stacking station will be in the form of a table with a chute like opening which will be known as a 'hopper'.

The stacking hopper will form a support for the stack on four sides as it is packed. It will also form a low-friction workbench by means of a flange forming a work surface. This workbench will be at an ergonomic height which the operator can use to slide objects into position around the load carrier. This will ease the need for the operator to lift the cases, therefore reducing the workload, fatigue and chances of injury. If lifting is necessary, a lifting arm to assist is provided. The load carrier will be presented into the hopper by means of a load carrier feed device at a height of approximately one packing layer below the work surface. This will enable the packing to begin on the first layers without delay. This device will also act as a load carrier destacker after stacking is finished.

The objects to be stacked will be presented to the operator by means of the supply hopper devices with supplied objects at an ergonomic discharge level, such that the objects can be slid on to the ball conveyor, the height of which will match the height of the stacking hopper.

The objects will be fed into the supply hoppers from below and raised by elevators being sourced by the AGV/AMR in the lower level and transferred via the interfaces to the elevators of the hopper like devices.

Stacking will commence once the load carrier is in place and the first objects can be placed directly onto the final load carrier without use of temporary or intermediate supports. In this phase the load carrier is supported by the feed device.

The operator transfers the desired object from the supply hopper to the ball conveyor and moves it on to the stacking hopper to the desired location on the load carrier. He is informed with the display how many objects to place and where to place the object.

Once the stacking layer is no longer at an ergonomic height the operator can index the stack downwards manually or by a pre-defined height so that the following layers can be packed. The operator will index the stack by using a pushbutton or foot pedal integrated into the hopper structure which drives the load carrier feed device. This process will continue until the load is fully built.

When the load carrier feed device has reached its lower limit within the hopper, a second load handling device (the load carrier support) will take the weight of the load seamlessly, i. e. without delay, while stacking commences. This will allow the load carrier feed device to be retracted and allow it to collect the next empty load carrier from a stack.

In order to maintain the stability of the load carrier during stacking, it is initially supported by the hopper side walls. However, the hopper is short and can only support the stack during its initial build. Once beyond the scope of the hopper and during "transit" an additional method is required. For this reason, a stretch-wrapper will be integrated into the structure and the wrapping of the product will commence as soon as the stack is at an appropriate height. This can occur on the lower part of the load while the packing operation is completed on the upper part therefore reducing any downtime.

Integrating the stretch wrapper into the structure will ensure that the wrapping occurs as close to the hopper as possible. This ensures that the amount of unsupported stack is negligible.

When the packing operation is completed, the operator will press a 'packing complete' pushbutton, integrated into the hopper, and the stack will index away while the wrapping process continues until complete. The finished stack will be removed via the interface and the AGV/AMR to a shipment area.

As soon as the packing operation is complete and the stack has lowered sufficiently in the hopper a new load carrier is inserted into position by the load carrier feed device so the packing process can begin again. This will eliminate any delay between each packing process, as the insertion of the new load carrier takes place even though the wrapping has not finished yet.

The objects will be supplied by the AMR/AGV in appropriate order to aid stable load carrier building and also in the correct order that 'family grouping' is achieved. This will ensure like for like products are together on the carrier upon arrival in the store. Objects will also be grouped according to height, weight and crush class. Optionally, objects may be pre-grouped in the pre-picking facility before being supplied.

The AMR/AGV take care of the supply of empty load carriers (pallets etc.) and also of the supply of objects according to the orders to be fulfilled. They also take care of the discharge of the finished (loaded) load carriers and their transportation to shipping etc. In parallel the AMR/AGV also return used supply carriers for restocking or reuse to storage areas and/or pre-picking areas. There is no need for conveyor systems (structured interfaces) linking these areas. The AMR/AGV perform all necessary exchanges.

Further advantages, properties and features of the invention are detailed in the following description of an exemplified embodiment with the aid of the drawings.

DESCRIPTION OF THE PREFERRED EMBODIMENTS

Figure 1:
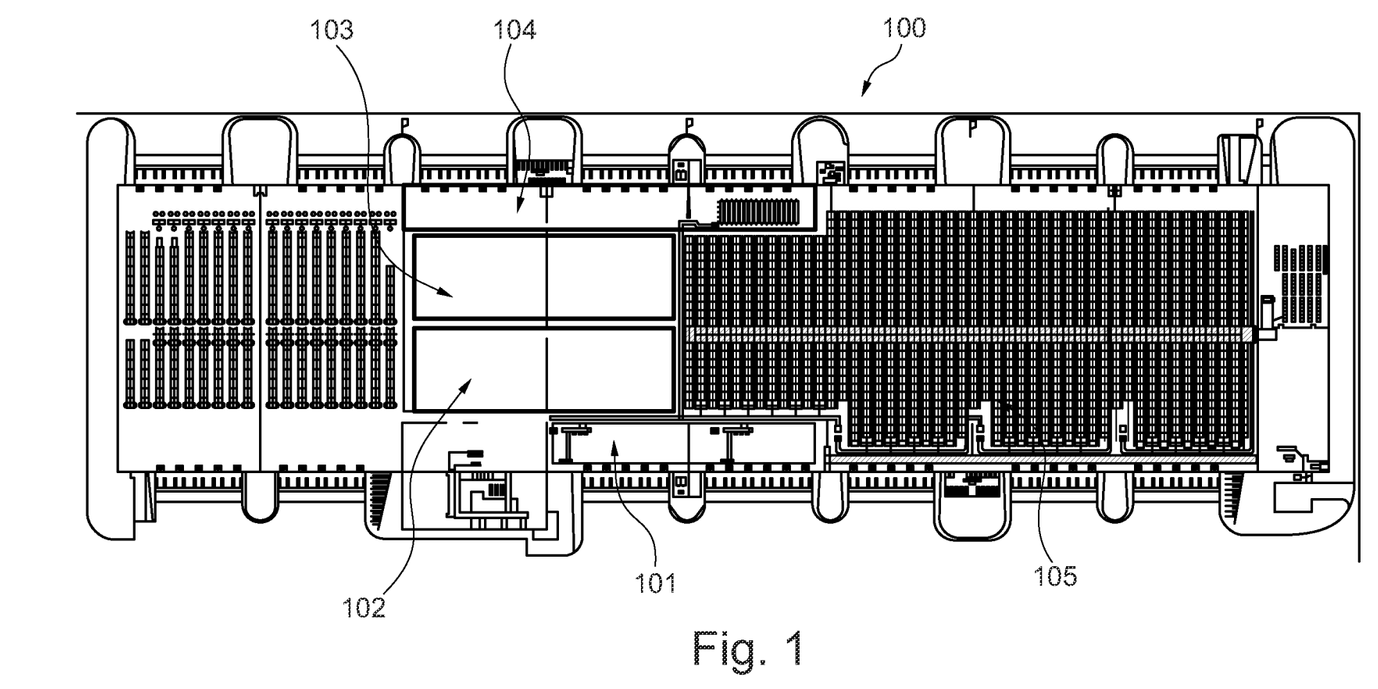
FIG. 1 shows a schematic plan view of a warehouse including workstations for manual multi-layer stacking of pallets.
Figure 2:
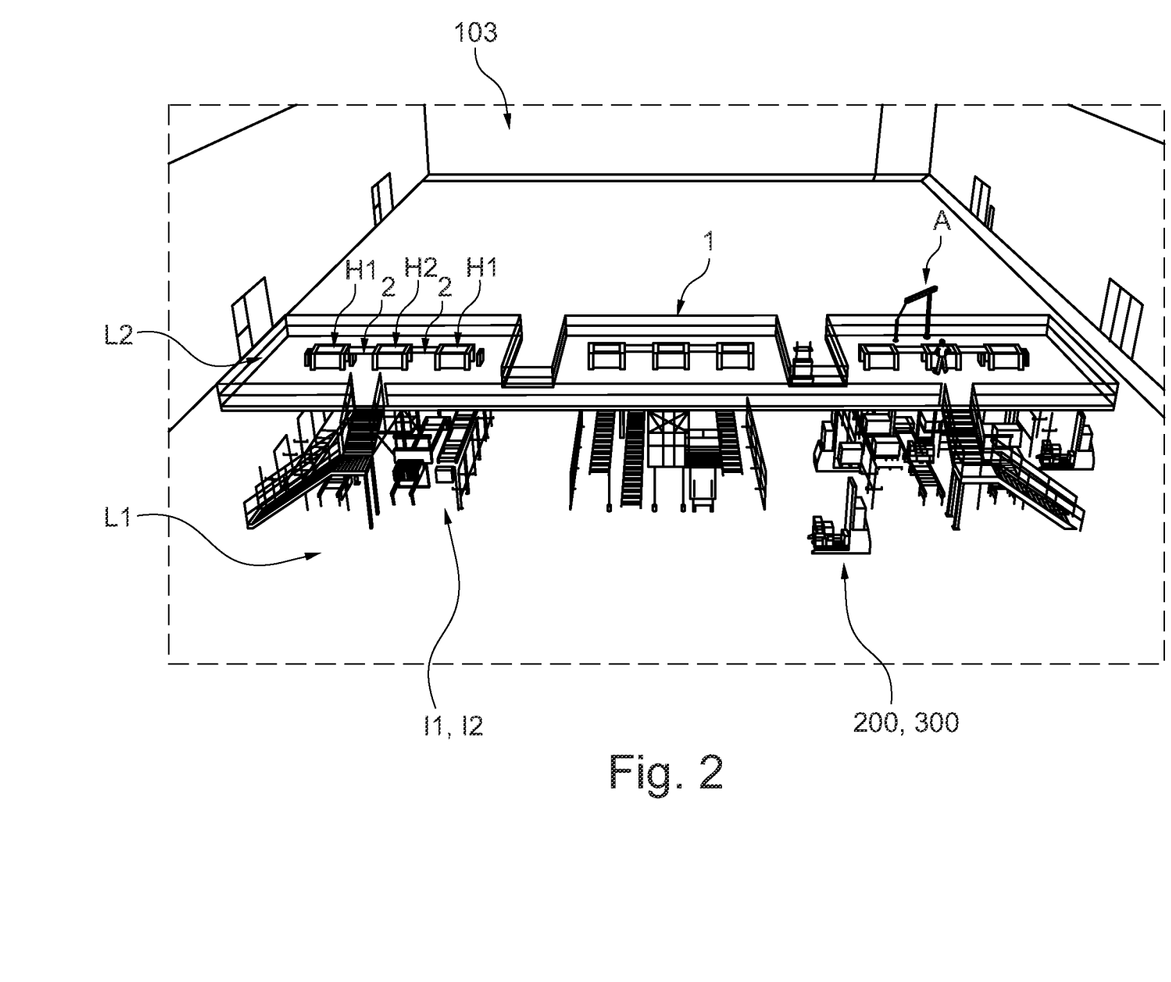
FIG. 2 shows a schematic perspective view of the workstation area of FIG. 1.
Figure 3:
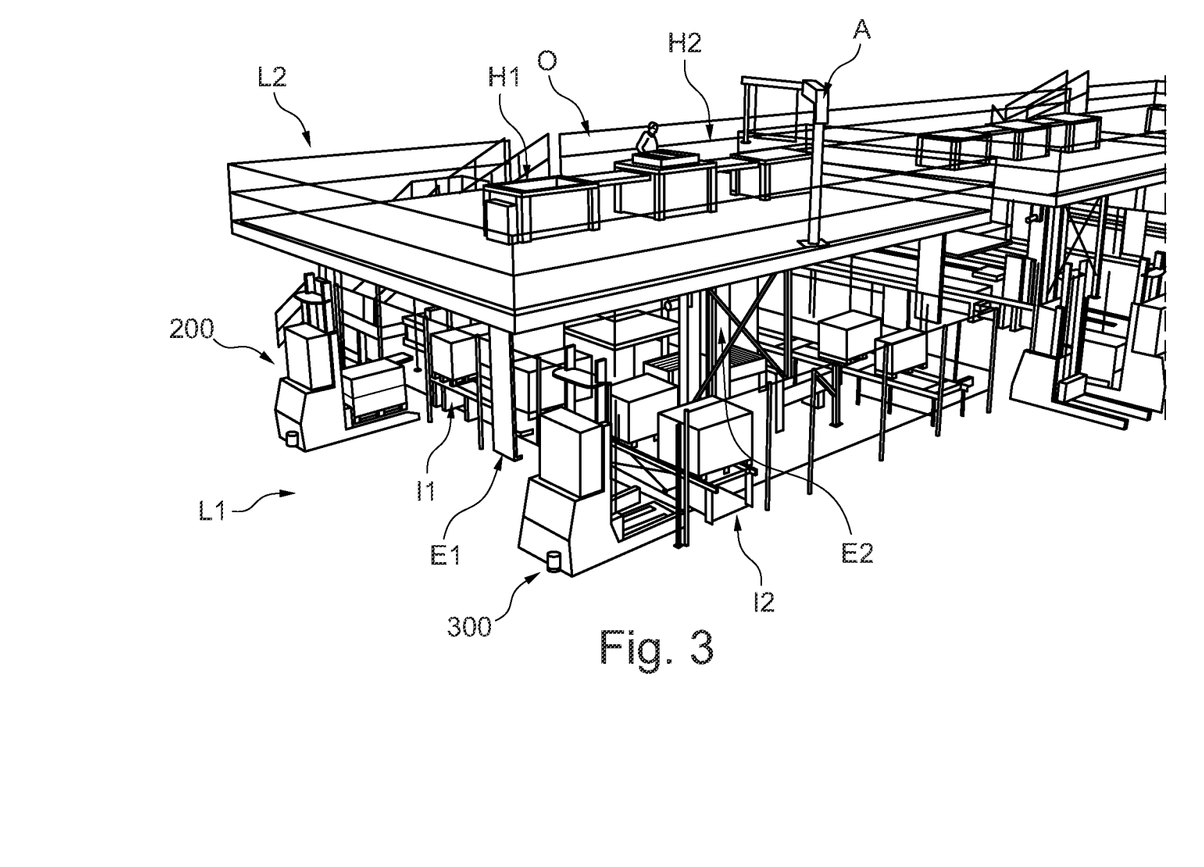
FIG. 3 shows a schematic perspective view of the workstation area of FIG. 1 from a different lower angle.
Figure 4:
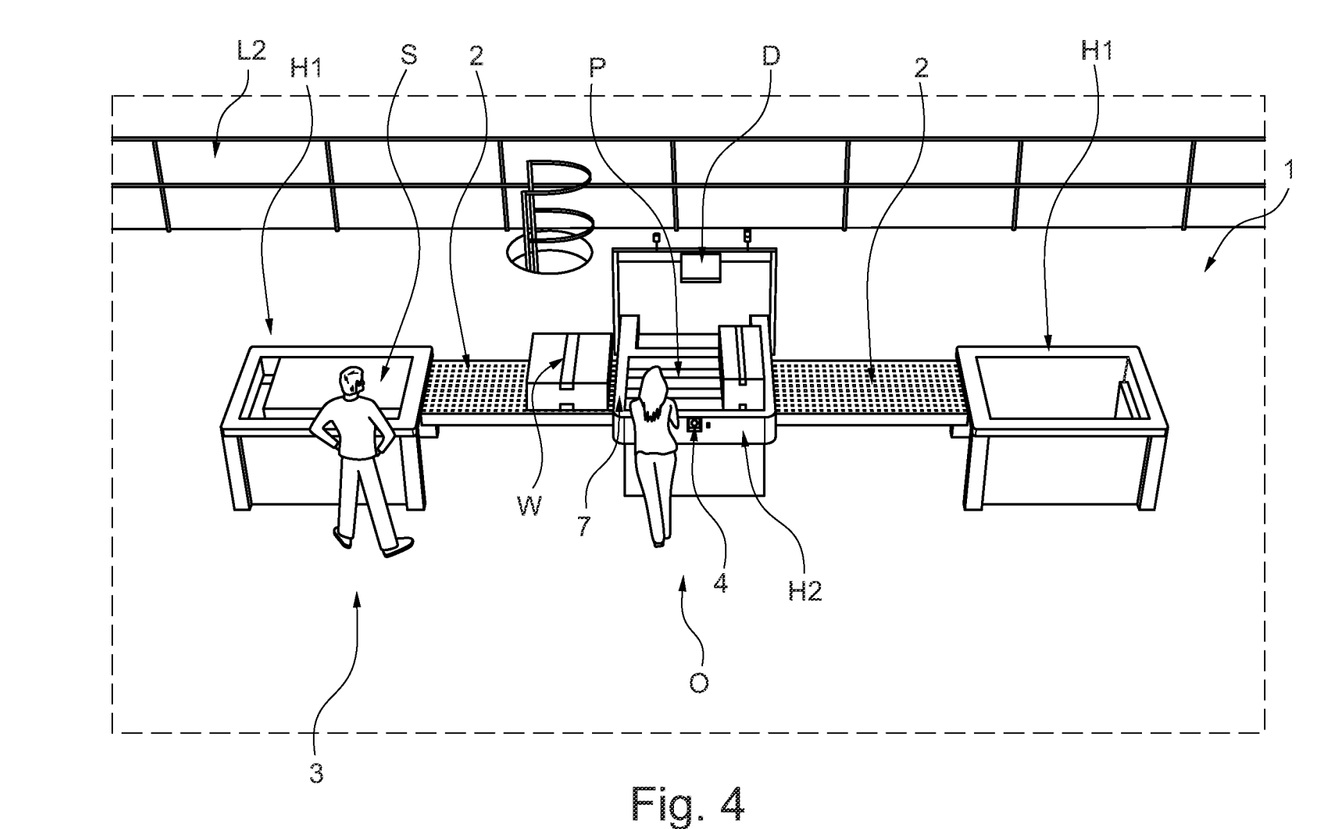
FIG. 4 shows a schematic perspective view of the workstation area of FIG. 1 from a different higher angle.
Figure 5:
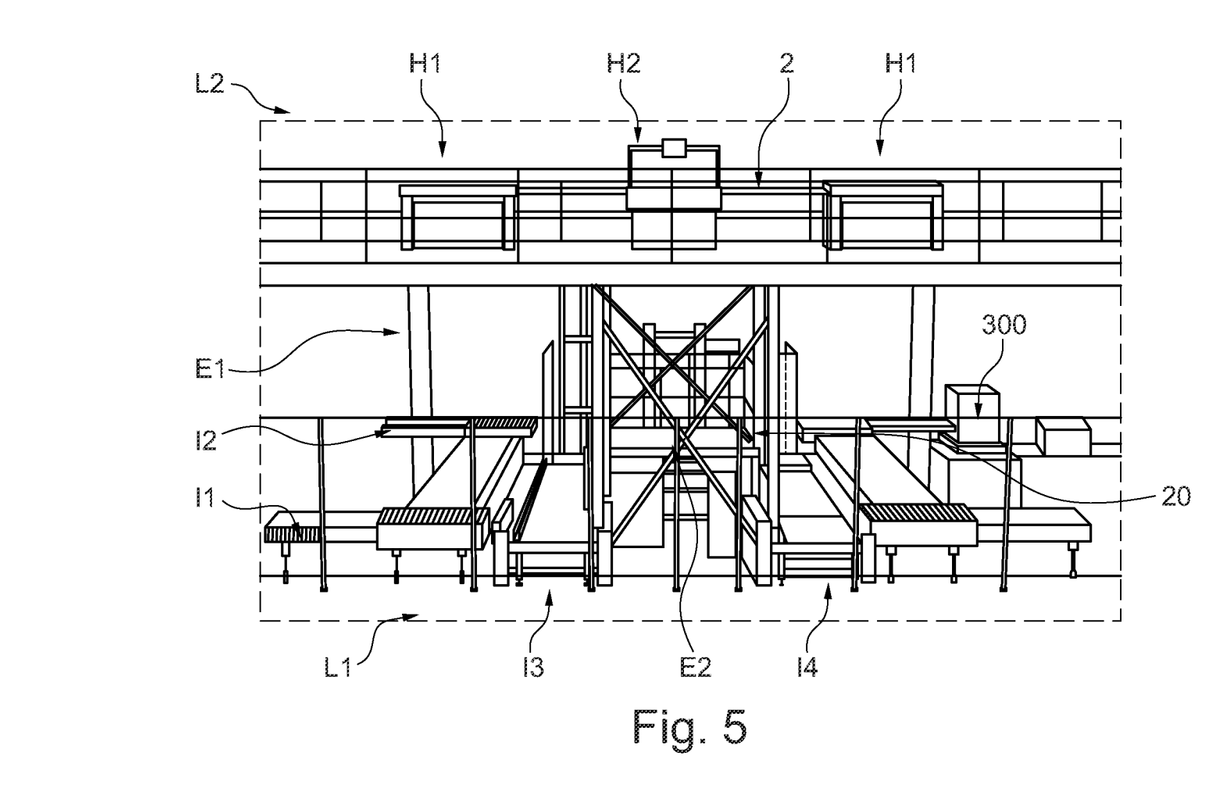
FIG. 5 shows a schematic perspective view of the workstation area of FIG. 1 from behind.

FIG. 1 gives a schematic overview of a warehouse denoted with 100 including a goods receiving area 101, a pre-picking facility area 102, a GTP (goods-to-person) workstation area 103 and a shipping area 104 as well as automated storage area 105 (by ASRS machines) and manually operated storage racking area. AGV 200 and AMR 300 travel between the area for supply, distribution and discharge of objects/goods and pallets as well as orders (finished pallets).

FIGS. 2-6 show workstation area 103 with a workstation 1 for manual multi-layer stacking of a pallet P in a spatial arrangement with objects to be packed W having different dimensions, wherein the spatial arrangement is determined by a computer system based on the object characteristics (dimensions, weight, stability etc.) or other requirements (shop-layout sequence etc.) of each object in a corresponding order list. The workstation 1 has a lower supply level L1 and an upper working level L2, raised by a mezzanine, on which the actual operator working positions 3 are formed.

The workstation 1 includes two hoppers like supply devices H1, in a linear arrangement with a hopper like stacking device H2 in between. The hopper like devices are connected by a ball conveyor 2. Hopper like supply devices H1 present/supply objects W to be placed on the pallet P to the operator. The objects are supplied by AGV 200 and AMR 300 on the supply level L1 from the pre-picking facility area 102.

The pre-picking facility area 102 may be used to supply the workstation with partially pre-picked donor pallets. The pre-picking facility area 102 is then operational to load the autonomous mobile robot (AMR) and/or an automated guided vehicle (AGV) with such pallets. The pre-picking can be performed according to known statistical/historical data concerning objects that are usually together in an order listing or are known at time of supply and contain objects partially available at that time in contrast to missing objects that need replenishment. Such partial pallets can be buffered in the pre-picking zone or area 102.

The workstation 1 may also be supplied with donor pallets having lower full layers of single type items as a starting level for stacking, i. e. if an order listing contains so many objects that these make up one or more full layers of the pallets, these can be supplied as such without the need for re-picking at the workstation 1. Such donor pallets having lower layers of single type items as starting level for stacking can also have partially filled layers, such as half layers etc.

The AGV 200 and AMR 300 transport the objects on pallets to interface I1 on the supply level L1 where they off load the supply pallets S. The interface I1 is a short conveyor (stub) connected to the elevator E1 of each supply device H1, which raises the supply pallet with the objects to the working level L2 in the hopper like supply device H1.

After the necessary amount of objects (indicated by a display D shown in FIG. 4) have been taken off the supply pallet (and moved onto conveyor 2) it is lowered back to the supply level L1 and discharged via second interface I2 so that a next supply pallet may be already in waiting to enter the elevator E1 from the interface I1.

Figure 6:
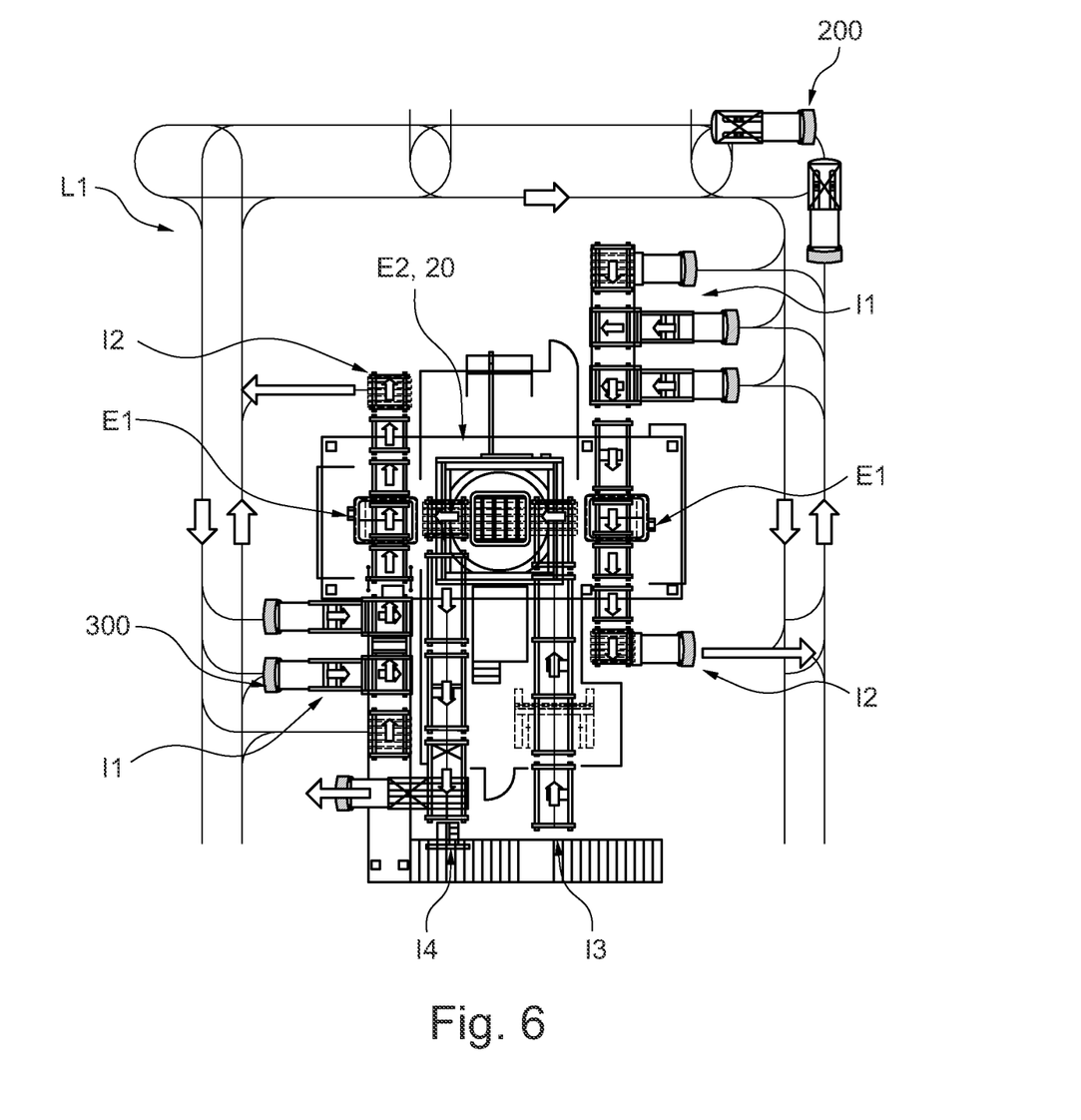
FIG. 6 shows a schematic plan view of a supply and discharge level below the workstation working level.

Again AGV 200 and AMR 300 take over the supply pallets from Interface I2 and transport these either back to storage for restocking if not empty or back to goods receiving area 101 or pre-picking facility area 102 for reuse. Travel paths of AGV 200 and AMR 300 are shown in FIG. 6 by arrows and hashed lines on the plan view of lower supply level L1.

Hopper like stacking device H2, in which a pallet P is presented, and which defines a workplace including a work surface and also forms a support for the stack being formed directly on the final pallet P on four sides as it is packed. The hopper like stacking device H2 forms a chute with a flange 7 forming the work surface 4, which surrounds the top side of the chute opening of the hopper like device H2 circumferentially and functions as a sliding plate together with ball conveyor 2. The four internal sidewalls of the chute function as the support on four sides of the stack (see FIG. 4).

This "workbench" is at an ergonomic height which the operator O can use to slide objects W into position around the pallet P in the hopper like device H2. This eliminates the need for the operator O to lift the objects W, therefore reducing the workload, fatigue and chances of injury. To facilitate and assist the operator(s) a material-handling arm A may be present for lifting bulky and heavy loads, which extends over all three hoppers like devices. Display D also indicates where an object is to be placed (located) on the pallet P to conform to the predetermined spatial arrangement.

The workplace 3 is configured for more than one operator O. A first operator O may take the first object W to be loaded from the hopper like device H1 on one side and slide it over the ball conveyor to hopper like stacking device H2 and eventually position it down at a desired spatial position on the stack being formed directly on the final pallet P. In parallel, a second operator may take the first object W to be loaded from the hopper like device H1 on the other side and slide it over the ball conveyor 2 to hopper like stacking device H2 and eventually position it down at a desired spatial position on the stack being formed directly on the final pallet P. Another split of operations is also possible between two operators. A first operator O may take the first object W to be loaded from the hopper like device H1 on one side and slide it over the ball conveyor. When picking is completed, the first operator may switch to the hopper like device H1 on the other side to take the next object W to be loaded from the hopper like device H1 on one side and slide it over the ball conveyor. In parallel, a second operator may take the object form the ball conveyor 2 to hopper like stacking device H2 and position it down at a desired spatial position on the stack being formed directly on the final pallet P. In this manner the two operators can take turns performing the stacking and at the same time the supply of objects via the two hoppers like supply devices H1 is optimally used for throughput.

Further, the hopper like stacking device H2 includes a movable load carrier support for orientating the pallet P at a height within the hopper like device H2 of approximately one packing layer below the work surface, so that the surface to place objects W on is more or less flush with the flange 7 or conveyor 2. The load carrier support uses vertical lift elevator E2 for lowering and/or raising the pallet P from the supply level L1 to the working level L2, which comprises support arms, spaced apart, so that the pallet P may rest on them, when transferred from tor to the interface I3, I4 on the supply level L1.

In like manner as for the supply of objects, the AGV 200 and AMR 300 supply empty pallets P and discharged finished (loaded) pallets P via interface I3 and I4 respectively, which connect to elevator E2 on the supply level L1. Finished pallets P are discharged via interface I4 and then transported to shipping area 104 by AGV 200.

To stabilize the finished pallets P a wrapping unit 20 is arranged below the hopper like stacking device H2 directly below the lower opening of the chute for layer wise stabilizing of the stack being formed upon the pallet P during stacking after leaving the chute of the hopper like device H2 by means of elevator E2. The wrapping unit 20 comprises a film feed unit which is movable on along a centered circular path around the stack/pallet P coming out of the chute. The wrapping unit is more or less arranged around elevator E2.

The embodiments of the invention in which an exclusive property or privilege is claimed are defined as follows:

1. A method for manual multi-layer stacking of objects on a load carrier in a predetermined spatial arrangement, with said objects having different dimensions, said method comprising:
   computer-aided determining of the spatial arrangement of the objects to be packed on the load carrier according to an order listing said objects;
   automatically delivering the objects to a workstation by an autonomous mobile robot and/or an automated guided vehicle in a supply level, wherein the objects are delivered according to a sequence based on the determined spatial arrangement to two object supplies of the workstation comprising a first object supply and a second object supply;
   supplying objects to a working level in said workstation via the first object supply and the second object supply, wherein the first object supply and the second object supply comprise lifts for moving the objects from the supply level to the working level;
   presenting objects to an operator at the working level;
   manually moving objects from the first object supply onto a first support that is in the working level and is connected to a manual stacking station in the working level, and manually moving objects from the second object supply onto a second support that is in the working level and is connected to the manual stacking station in the working level, wherein the two object supplies and the manual stacking station are arranged such that objects are provided to opposite sides of the manual stacking station;

presenting the load carrier in said manual stacking station which defines a work surface for supporting the stack being formed on the load carrier as it is stacked with the objects;

manually placing each object at a position according to said predetermined spatial arrangement in the stack being formed on the load carrier in said manual stacking station; and automatically discharging finished load carriers in said supply level by said autonomous mobile robot and/or automated guided vehicle from said manual stacking station.

2. The method according to claim 1, further comprising supplying objects according to the spatial arrangement in a supply level from a pre-picking facility in a grouped manner on pallets by said autonomous mobile robot and/or automated guided vehicle.

3. The method according to claim 1, wherein said workstation is supplied with partially pre-picked donor pallets.

4. The method according to claim 3, wherein said partially pre-picked donor pallets are sourced from a buffer-zone or pre-picking zone that is operational to load the autonomous mobile robot and/or an automated guided vehicle.

5. The method according to claim 1, wherein said workstation is supplied with donor pallets having lower full layers of single type items as starting level for stacking.

6. The method according to claim 1, further comprising switching by the operator from the first object supply to the second object supply during exchange of a used object supply carrier in the first object supply.

7. The method according to claim 1, wherein the supply level is arranged below said working level.

8. The method according to claim 1, further comprising a material handling arm for manually moving selected ones of the objects from the first object supply or the second object supply to the first support or the second support, respectively, and/or from the first support or the second support to the load carrier.

9. The method according to claim 1, wherein said first support and/or said second support comprises a conveying system comprising a ball conveyor or a roller conveyor.

10. The method according to claim 1, wherein an exchange of used object supply carriers takes place on the supply level by an automated guided vehicle or autonomous mobile robot picking the object supply carriers and returning them to a storage and/or a pre-picking facility.

11. The method according to claim 1, wherein supplying and presenting objects to said working level in said workstation takes place by a hopper like supply device.

12. The method according to claim 1, further comprising informing the operator how many objects to pick from the object supply and/or where to place the objects on the load carrier according to the predetermined spatial arrangement in the stack.

13. The method according to claim 1, wherein the load carrier comprises a pallet or a roller cart.

14. A system for multi-layer stacking of objects having different dimensions in a spatial arrangement on a load carrier comprising a pallet, said system comprising:

a workstation, said workstation having a working level, a manual stacking station and two object supplies comprising a first object supply and a second object supply;

a support disposed between each of the object supplies and the manual stacking station in the working level, wherein each support extends from a respective one of the first and second object supplies to opposite sides of the manual stacking station;

an autonomous mobile robot and/or an automated guided vehicle configured to automatically deliver objects to the workstation;

a computer system, said computer system configured to predetermine the spatial arrangement on the pallet according to an order listing of the objects;

a supply level arranged below said working level, wherein the supply level has a receiving interface for receiving supplied objects from the autonomous mobile robot and/or the automated guided vehicle and a discharge interface for discharge of finished load carriers;

the first and second object supplies each comprise a hopper like supply device supplying and presenting objects to said working level including an elevator for lowering and/or raising the supplied objects between the supply level and the working level; and a hopper like stacking device for presenting the load carrier in said manual stacking station which defines a work surface and forms a support for the stack being formed on the load carrier on four sides as it is packed with said objects and including an elevator for lowering and/or raising the load carrier between the supply level and the working level;

wherein the autonomous mobile robot and/or an automated guided vehicle are configured to deliver the objects to the workstation in sequence based on the spatial arrangement, wherein the workstation is configured for manual placement of each object at a position according to said predetermined spatial arrangement in the stack being formed on the pallet, and wherein the supports on the working level are connected between the hopper like supply devices and the hopper like stacking device.

15. The system according to claim 14, wherein said hopper like supply devices and said hopper like stacking device are in a linear arrangement with the two hopper like supply devices on opposite sides of the one hopper like stacking device.

16. The system according to claim 14, wherein the workstation has a material handling arm at one or both of the hopper like supply devices and/or the hopper like stacking device.

17. The system according to claim 14, wherein said workstation comprises a stationary or wearable display or laser pointer configured to inform the operator how many objects to pick from the object supply and/or where to place the objects on the load carrier according to the predetermined spatial arrangement in the stack.

18. The system according to claim 14, wherein said workstation includes a wrapping unit arranged below the hopper like stacking device for layer wise stabilizing of the stack being formed upon the load carrier.

19. The system according to claim 14, wherein the autonomous mobile robot and/or the automated guided vehicle deliver objects to the first object supply and the second object supply in the supply level, and wherein the first object supply and the second object supply comprise elevators for delivering objects to the working level.

* * * * *